United States Patent Office 3,479,365
Patented Nov. 18, 1969

3,479,365
NEW ISOTHIAZOLE SYNTHESIS
Takayuki Naito and Susumu Nakagawa, Tokyo, Japan, assignors to Bristol-Banyu Research Institute, Ltd., Tokyo, Japan, a Japanese corporation
No Drawing. Filed May 19, 1967, Ser. No. 639,623
Int. Cl. C07d 91/12; A61k 21/00
U.S. Cl. 260—302                                          5 Claims

ABSTRACT OF THE DISCLOSURE

The synthesis of valuable isothiazole intermediates has been achieved by a new process, an illustrative example of which would be the reaction of 1-amino-2-cyano-1-phenyl-1-butene with thionyl chloride to produce 4-cyano-5-methyl-3-phenylisothiazole.

This compound is readily hydrolyzed to the corresponding 4-isothiazolecarboxylic acid and is subsequently coupled with 6-aminopenicillanic acid to produce valuable antibacterial agents.

BACKGROUND OF THE INVENTION

Field of the invention

This invention relates to a process for the preparation of isothiazoles, said isothiazoles being valuable as intermediates in the preparation of potent antibacterial agents, i.e., sodium 6-(5-methyl-3-phenylisothiazole-4-carboxamido)-penicillanate.

Description of the prior art

Several chemical processes are known in the art for the preparation of isothiazoles. These processes are usually difficult, long and produce poor yields and quality material. Because of the superior antibacterial activity of the isothiazole substituted penicillins, it was necessary to develop new and commercially feasible routes to isothiazoles. The instant invention helps to accomplish this goal.

SUMMARY OF THE INVENTION

The isothiazole intermediates prepared by the process claimed herein are compounds having the formula

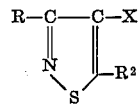

wherein R is (lower)alkyl or AR, and $R^2$ is hydrogen, halogen (lower)alkyl or AR, wherein AR is a group of the formula

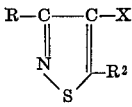

in which A, B and C are alike or different and each represents hydrogen, fluoro, chloro, bromo, iodo, trifluoromethyl, methylsulfonyl, nitro, (lower)alkyl or (lower)alkoxy.

The process is usually performed by the mixing together an amino compound having the formula

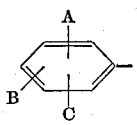

in which R and $R^2$ are as defined above and X represents

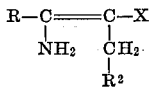
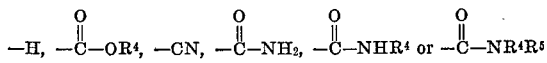

in which $R^4$ and $R^5$ are alike or different and each is (lower)alkyl or AR, wherein AR is as defined above, with a thionyl halide or sulfur chloride to produce an isothiazole having the formula

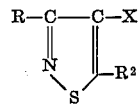

wherein R, $R^2$ and X are as defined above.

This invention relates to a new process for the synthesis of substituted isothiazoles, particularly 3,4,5-substituted isothiazoles, which compounds are most valuable as chemical intermediates in the further synthesis of biologically active compounds such as the isothiazole penicillins and cephalosporins.

The never ending search for new and improved antibacterials, such as the synthetic penicillins, has led to the synthesis of a series of substituted isothiazole derivatives of 6-APA (6-aminopenicillanic acid). These penicillins have value as antibacterial agents, as nutritional supplements in animal feeds, as agents for the treatment of mastitis in cattle, as therapeutic agents in poultry and animals, including man, in the treatment of infectious diseases caused by Gram-positive bacteria, especially *Staphylococcus aureus* and other penicillinase producing bacteria, and sometimes those infections caused by Gram-negative bacteria.

The superior efficacy exhibited by the isothiazole penicillins required that a new synthesis be developed for the preparation of large quantities of 3,4,5-substituted isothiazoles having the formula

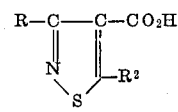

wherein R is (lower)alkyl or Ar, and $R^2$ is hydrogen, halogen, (lower)alkyl or Ar, wherein Ar is a group of the formula

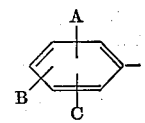

in which each of A, B and C represents hydrogen, fluoro, chloro, bromo, iodo, trifluoromethyl, methylsulfonyl, nitro, (lower)alkyl and (lower)alkoxy.

Some of the isothiazoles prepared by the process described herein are compounds that have been prepared previously by methods that gave yields that were low and commercially undesirable.

T. Naito and S. Nakagawa, in their U.S. Patent applications Nos. 466,414 and 518,801, both now abandoned have reported yields that were generally well below 10% in the synthesis of these types of isothiazoles. Furthermore, their methods involved numerous long and tedious steps.

The new and novel process claimed herein helps to solve both problems by a more direct synthesis.

The invention claimed herein is a new and novel process for the synthesis of isothiazoles of the formula

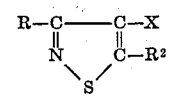

wherein R is (lower) alkyl or Ar, and $R^2$ is hydrogen, halogen, (lower)alkyl or Ar, wherein Ar is a group as defined above; and X represents

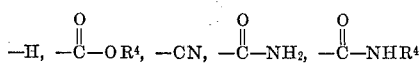

or

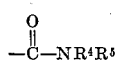

in which $R^4$ and $R^5$ are alike or different and each is (lower)alkyl or Ar, wherein Ar is as defined above.

The process is usually performed by the *mixing* together an amino compound having the formula

 (I)

in which R and $R^2$ are as defined above and X represents

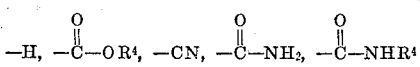

or

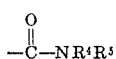

in which $R^4$ and $R^5$ are alike or different and each is (lower)alkyl or Ar, wherein Ar is as defined above, with a thionyl halide or sulfur chloride or their functional equivalent to produce an isothiazole having the formula

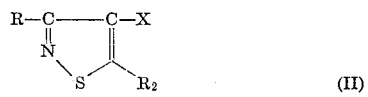 (II)

wherein R, $R^2$ and X are as defined above.

The term "(lower)alkyl" as used herein means both straight and branched chain aliphatic hydrocarbon radicals having from one to eight carbon atoms such as methyl, ethyl, propyl, isopropyl, butyl, isobutyl, t-butyl, amyl, hexyl, etc. Where the term "(lower)" is used as part of the description of another group e.g. "(lower) alkoxy," it refers to the alkyl portion of such group which is therefore as described above in connection with "(lower)alkyl" and thus includes such radicals as methoxy, ethoxy, isopropoxy, etc.

A preferred embodiment of the present invention is the process comprising the mixing together an amino compound having the formula

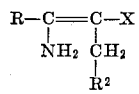

in which R is (lower)alkyl or Ar, and $R^2$ is hydrogen, halogen, (lower)alkyl or Ar, Ar being a group having the formula

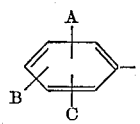

in which A, B and C are alike or different and each represent hydrogen, fluoro, chloro, bromo, iodo, trifluoromethyl, methylsulfonyl, nitro, (lower)alkyl or (lower) alkoxy, and X represents

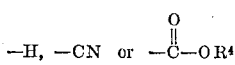

in which $R^4$ is (lower)alkyl or Ar, Ar being as defined above with thionyl chloride or sulfur chloride to produce an isothiazole having the formula

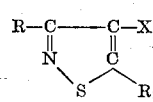

A more preferred embodiment of the present invention is the process comprising the mixing together of an amino compound having the formula

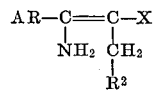

in which Ar is a group having the formula

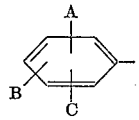

wherein A, B and C are alike or different and each represent hydrogen, fluoro, chloro, bromo, iodo, trifluoromethyl, methylsulfonyl, nitro, (lower)alkyl or (lower) alkoxy, $R^2$ is (lower)alkyl and X represents

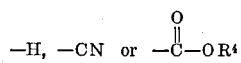

in which $R^4$ is (lower)alkyl, with thionyl chloride or sulfur chloride to produce an isothiazole having the formula

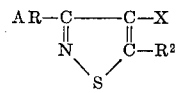

wherein Ar, X and $R^2$ are as defined above.

A most preferred embodiment of the present invention is the process comprising the mixing of an amino compound having the formula

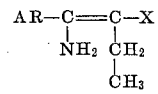

in which Ar is a group having the formula

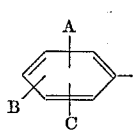

wherein A, B and C are alike or different and each is hydrogen, fluoro, chloro, bromo, iodo, trifluoromethyl, methylsulfonyl, (lower)alkyl or (lower)alkoxy and X represents

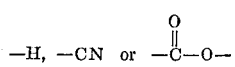

(lower)alkyl with thionyl chloride or sulfur chloride to produce an isothiazole having the formula

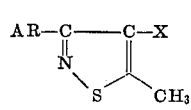

wherein Ar and X are as defined above.

The practice of the process of the present invention is usually carried out as elucidated below:

*An amino compound,* having the formula

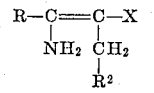 (I)

which may be illustrated in its tautomeric form as

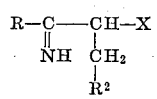

wherein R is (lower)alkyl or Ar, and $R^2$ is hydrogen, halogen, (lower)alkyl or Ar, in which Ar is a group having the formula $$\underset{B}{\overset{A}{\underset{C}{\bigcirc}}}$$

in which A, B and C are alike or different and each represent hydrogen, fluoro, chloro, bromo, iodo, trifluoromethyl, methylsulfonyl, nitro, (lower)alkyl or (lower)alkoxy; and X represents $$-H, \ -\overset{O}{\underset{\|}{C}}-OR^4, \ -CN, \ -\overset{O}{\underset{\|}{C}}-NH_2, \ -\overset{O}{\underset{\|}{C}}-NHR^4$$

or $$-\overset{O}{\underset{\|}{C}}-NR^4R^5$$

in which $R^4$ and $R^5$ are alike or different and each is (lower)alkyl or Ar, wherein Ar is as defined above; *is mixed with* a thionyl halide, but preferably thionyl chloride, or sulfur chloride (SCl, $S_2Cl_2$), or its functional equivalent as a sulfur donating-oxidizing agent, in a ratio of at least one mole of thionyl chloride, or its equivalent, to one mole of compound I, but preferably in a ratio of about three to about six moles of thinyl chloride or sulfur chloride, to about one mole of compound I.

The reaction can be carried out in the absence of any other solvent when a large excess of thionyl chloride or its equivalent is used. Otherwise, it is performed in a reaction-inert solvent usually selected from the group comprising benzene, toluene, xylene, tetrahydrofuran, ligroin, ether, naphtha, dioxane and their equivalents in the temperature range of about 0° C. to the reflux temperature of the reaction system, but preferably at about the reflux temperature, for a period of time of about one to about 48 hours, but preferably for about two hours to about 20 hours to produce an isothiazole having the formula $$\underset{N\diagdown S\diagup C-R^2}{R-C-\!-\!-C-X} \quad (II)$$

wherein R, $R^2$ and X are described above.

The reaction mixture containing compound II is poured into crushed ice. The resultant oily gum is extracted from the water by successive ether extraction. The ethereal extracts are washed with water and dried over anhydrous sodium sulfate. The ether is evaporated in vacuo. The resultant residue is purified by one of several techniques, i.e., crystallization, fractional crystallization, chromatography, counter-current distribution, etc., to produce a purified compound II which is suitable for conversion to the corresponding isothiazole-4-carboxylic acid having the formula $$\underset{N\diagdown S\diagup C-R^2}{R-C-\!-\!-C-CO_2H} \quad (III)$$

The hydrolysis of compound II to compound III is usually performed by dissolving compound II in a polar solvent selected from the group comprising methanol, ethanol, propanol, butanol, ethylene glycol, propylene glycol or aqueous mixtures thereof and treating the resultant solution with 5–10% alkali metal hydroxide or mineral acid in a temperature range of 0° C. to 100° C. for several hours.

The solution is acidified when saponified by base, then cooled and diluted with water to yield compound III.

In many instances, it is possible to proceed directly to compound III by conducting the hydrolysis directly on the residue of compound II as obtained from the ethereal extract prior to purification. When this is so, purification is carried out on the isothiazole-4-carboxylic acid in a manner similar to that described above for the purification of compound II.

Compound III is usually treated with thionyl chloride to form an acid chloride having the formula $$\underset{N\diagdown S\diagup C-R^2}{R-C-\!-\!-\overset{O}{\underset{\|}{C}}-\overset{O}{\underset{\|}{C}}-Cl} \quad (IV)$$

which is further condensed with 6-aminopenicillanic acid to produce an isothiazole penicillin having the formula $$\underset{N\diagdown S\diagup C-R^2}{R-C-\!-\!-\overset{O}{\underset{\|}{C}}-\overset{O}{\underset{\|}{C}}-NH-\!\!\!\underset{O=\!-N-CO_2H}{\overset{S\diagdown C(CH_3)_2}{\diagup}}} \quad (V)$$

Compounds having the Formula V are valuable as antibacterial agents, said activity being previously described in the introduction.

The objectives of the present invention have been achieved, by the provision according to the present invention, of the process for the synthesis of isothiazoles having the formula $$\underset{N\diagdown S\diagup C-R^2}{R-C-\!-\!-C-X}$$

wherein R is (lower)alkyl or Ar, and $R^2$ is hydrogen, halogen, (lower)alkyl or Ar, wherein Ar is a group of the formula $$\underset{B}{\overset{A}{\underset{C}{\bigcirc}}}$$

in which A, B and C are alike or different and each represent hydrogen, fluoro, chloro, bromo, iodo, trifluoromethyl, methylsulfonyl, nitro, (lower)alkyl and (lower)alkoxy; X represents $$-H, \ -\overset{O}{\underset{\|}{C}}-OR^4, \ -CN, \ -\overset{O}{\underset{\|}{C}}-NH_2, \ -\overset{O}{\underset{\|}{C}}-NHR^4$$

or $$-\overset{O}{\underset{\|}{C}}-NR^4R^5$$

in which $R^4$ and $R^5$ are (lower)alkyl or Ar, wherein Ar is as defined above, but X is preferably $$-H, \ -\overset{O}{\underset{\|}{C}}-OR^4 \ \text{or} \ -CN$$

which comprises the *mixing* together of an amino compound having the formula $$\underset{\underset{R^2}{|}}{\underset{NH_2 \ CH_2}{R-C=\!=\!C-X}}$$

wherein R is (lower)alkyl or Ar, and $R^2$ is hydrogen, halogen, (lower)alkyl or Ar, Ar and X being as defined above, with a thionyl halide, but preferably thionyl chloride, or sulfur chloride, in a ratio of at least one mole of thionyl chloride or sulfur chloride to one mole of the amino compound, but preferably in a ratio of about three to six moles of thionyl chloride or sulfur chloride to about one mole of the amino compound in a reaction inert solvent or without any solvent in the temperature range of about 0° C. to the reflux temperature of the reaction system, but preferably at about the reflux temperature, for a period of time of about one to about forty-eight hours, but preferably for about two to twenty hours.

In the preferred embodiments of the present invention R is Ar as defined above and especially phenyl, halophenyl and dihalophenyl, X is $-H$, $-CN$ or $CO_2R^4$ wherein $R^4$ is (lower)alkyl, $R^2$ is (lower)alkyl and especially methyl.

METHODS OF PREPARATION OF THE AMINO COMPOUNDS CHARACTERIZED BY FORMULA I

Method I

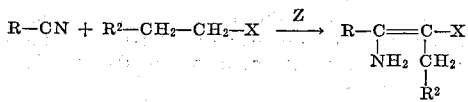

R is (lower)alkyl or Ar, and $R^2$ is hydrogen, halogen, (lower)alkyl or Ar, wherein Ar is a group having the formula

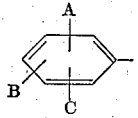

in which A, B and C are alike or different and each is hydrogen, fluoro, chloro, bromo, iodo, trifluoromethyl, methylsulfonyl, nitro, (lower)alkyl or (lower)alkoxy; and X is

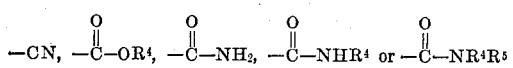

in which $R^4$ and $R^5$ are (lower)alkyl or Ar; and Z is a catalyst such as metallic sodium or potassium, or $NaNH_2$ or NaH, or their functional equivalents as a strong base.

Method II

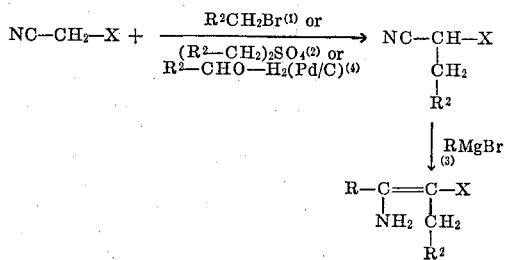

R, $R^2$ and X are as described above for method I.

Method III

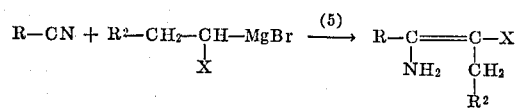

R and $R^2$ are as described above for method I; and X is

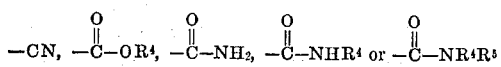

in which $R^4$ and $R^5$ are (lower)alkyl or Ar, wherein Ar is as defined above.

DESCRIPTION OF THE PREFERRED EMBODIMENTS

The following examples will serve to illustrate but not to limit the present invention.

[1] J. H. Boothe and C. O. Wilson, J. Am. Chem. Soc., 6, 448 (1946).
[2] E. Bowden, J. Am. Chem. Soc., 60, 131 (1938).
[3] Cf. R. Lukeš and J. Kováa, Chem. Listy, 50, 272 (1956); C. A., 50, 7796ᵈ (1956); R. Lukeš and J. Kloubek, Collection Czech. Chem. Communs., 25, 607 (1960); C.A. 54, 11984ᵉ (1960).
[4] E. R. Alexander and A. C. Cope, J. Am. Chem. Soc., 66, 886 (1944).
[5] Cf. P. L. Pickard and D. J. Vaughan, J. Am. Chem. Soc., 72, 876 (1950); P. L. Pickard and S. H. Jenkins, Jr., ibid., 75, 5899 (1953; P. L. Pickard and J. L. Tolbert, J. Org. Chem., 26, 4886 (1961).

Example 1.—1-amino-2-cyano-1-phenyl-1-butene

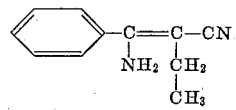

(A) A mixture of 105 g. (1.0 mole) of benzonitrile and 70 g. (1.0 mole) of n-butyronitrile in 500 ml. of ether was slowly added to a dispersion of 23 g. (1.0 mole) of metallic sodium in toluene with stirring over a period of about 25 hours at 20° C. to 30° C. The color of the mixture gradually turned red. Stirring at room temperature was continued an additional 6 hours and the mixture was allowed to stand overnight.

The excess sodium dispersion left unreacted in the mixture was cautiously decomposed with water and the ether layer which separated was collected, washed with saturated sodium chloride solution and dried over anhydrous sodium sulfate. The ether was evaporated and the residue distilled at 148° C.–150° C./1.8 mm. Hg pressure to yield 79 g. (46%) of 1-amino-2-cyano-1-phenyl-1-butene.

(B) To 200 ml. of liquid ammonia containing about 0.1 g. of ferric nitrate was added portionwise 4.8 g. (0.21 atom) of sodium at −40 to −50° C. To the blue sodium amide solution was added dropwise a solution of 20.6 g. (0.2 mole) of benzonitrile and 13.8 g. (0.2 mole) of butyronitrile in 100 ml. of ether. After the addition was completed, liquid ammonia was replaced with 200 ml. of dry ether and the solution was refluxed for 3 hours. To the reaction mixture was cautiously added 200 ml. of water and the ether layer which separated was washed with four 200-ml. portions of water, dried over anhydrous sodium sulfate and the solvent was evaporated. The residue was distilled to give 17.1 g. (50%) of 1-amino-2-cyano-1-phenyl-2-butene boiling at 145° C./1.5 mm.

(C) A 50% dispersion of sodium hydride in mineral oil (4.8 g., 0.1 mole) was mixed with 100 ml. of dry benzene and to the stirred mixture was added a solution of 10.3 g. (0.1 mole) of benzonitrile and 6.9 g. of (0.1 mole) of butyronitrile in 100 ml. dry benzene at 40–50° C. After the addition was completed, the mixture was stirred for 4 hours at 70° C., then cooled to room temperature and 200 ml. of water was cautiously added dropwise. The benzene layer was separated, washed with 100 ml. of water and the solvent evaporated. The residue was distilled under reduced pressure and a fraction boiling at 100–160° C./1.5 mm. was collected and redistilled to give 1.8 g. (11%) of 1-amino-2-cyano-1-phenyl-2-butene boiling at 140–145° C./1.5 mm.

Example 2.—4-cyano-4-methyl-3-phenylisothiazole

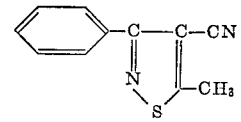

(A) Three grams (0.017 mole) of the 1-amino-2-cyano-1-phenyl-1-butene prepared in Example 1 was dissolved in 30 ml. of toluene. To this solution was added 6.2 g. (0.052 mole) of thionyl chloride in one portion. The mixture was refluxed for 16 hours then allowed to stand overnight. The resultant solution was poured into crushed ice and then extracted several times with 50 ml. portions of ether. The combined ethereal extracts were washed with water and dried over anhydrous sodium sulfate. The ether was evaporated and the residue dissolved in ligroin. The solution was then subjected to purification by chromatography on alumina. Crystalline residues were obtained from the fractions eluted with ligroin and some of the ligroin-benzene combinations. The crystalline solids were combined and recrystallized from ligroin to yield 1.57 g. (46%) of 4-cyano-5-methyl-3-phenylisothiazole, M.P. 76–78° C.

(B) Substitution in the procedure of Example 2 (A) for thionyl chloride used therein of sulfur monochloride (7.0 g., 0.052 mole) produced 0.4 g. (12%) of 4-cyano-5-methyl-3-phenylisothiazole.

(C) A mixture of 3 g. (0.017 mole) of 1-amino-2-cyano-1-phenyl-1-butene and 30 ml. (49 g., 0.41 mole) of thionyl chloride was refluxed for 4 hours to yield 0.51 g. (17%) of 4-cyano-5-methyl-3-phenylisothiazole.

(D) A mixture of 3 g. (0.017 mole) of 1-amino-2-cyano-1-phenyl-1-butene and 30 ml. (50 g., 0.37 mole) of sulfur monochloride was refluxed for 16 hours to yield 1.12 g. (32%) of 4-cyano-5-methyl-3-phenylisothiazole.

Example 3.—1-amino-2-cyano-1-(2,6-dichlorophenyl)-1-butene

Substitution in the procedure of Example 1 for the benzonitrile used therein of 2,6-dichlorobenzonitrile produced 1-amino-2-cyano-1-(2,6-dichlorophenyl)-1-butene, M.P. 127–129° C.

Example 4.—4-cyano-3-(2,6-dichlorophenyl)-5-methylisothiazole (A) To a solution of 1.3 g. (0.0054 mole) of 1-amino-2-cyano-1-(2,6-dichlorophenyl)-1-butene in 50 ml. of dry toluene was added 3.5 g. (0.029 mole) of thionyl chloride and the mixture was refluxed for 48 hours. The reaction mixture was poured into 50 g. of crushed ice. The aqueous layer was separated from toluene layer and extracted twice with 30 ml. of ether. The toluene layer was combined with the ethereal extracts, washed with three 20-ml. portions of water, dried with anhydrous sodium sulfate, the organic solvent was evaporated in vacuo. The residue was crystallized from ligroin to give 0.8 g. (55%) of 4-cyano-3-(2,6-dichlorophenyl)-5-methylisothiazole, M.P. 124–125° C.

To a solution of 0.72 g. (0.003 mole) of 1-amino-2-cyano-1-(2,6-dichlorophenyl)-1-butene in 15 ml. of dry toluene was added 2 g. (0.015 mole) of sulfur monochloride and the mixture was refluxed for 45 hours. The reaction mixture was poured into 30 g. of crushed ice and adjusted to pH 9.0 with 50% potassium hydroxide solution. The aqueous layer was separated from the toluene layer and extracted with two 10-ml. portions of toluene. The extracts were combined with the toluene layer, washed with two 10-ml. portions of water, dried with anhydrous sodium sulfate and evaporated into dryness. The residue was crystallized from ligroin to give 0.23 g. (29%) of 4-cyano-3,(2,6-dichlorophenyl)-5-methylisothiazole.

Example 5.—5-methyl-3-phenylisothiazole (A) To a mixture of 3 g. (0.02 mole) of 1-amino-1-phenyl-1-butene, 10 g. (0.126 mole) of pyridine and 20 ml. of dry toluene was added dropwise 7.5 g. (0.062 mole) of thionyl chloride at 0° C. and the mixture was stirred at room temperature during which exothermic reaction occurred and the temperature raised to 50–60° C. After the exothermic reaction had ceased, the mixture was stirred for 2 hours at room temperature, then allowed to stand for 48 hours at room temperature and poured into 50 g. of crushed ice. The toluene layer was separated and the aqueous layer was washed with two 30-ml. portions of ether. The combined organic solution was washed with two 10 ml. portions of water, dried with anhydrous sodium sulfate and evaporated under reduced pressure. The residue was purified by chromatography to produce 215 mg. (6%) of 5-methyl-3-phenylisothiazole, M.P. 48–49° C.

4-bromo-5-methyl-3-phenylisothiazole (B) To a stirred mixture of 5 g. (0.029 mole) of 5-methyl-3-phenylisothiazole, 5.7 g. (0.07 mole) of anhydrous sodium acetate and 50 ml. of acetic acid was added dropwise 6.5 g. (0.04 mole) of bromine and the mixture was stirred for 3 hours at room temperature. The reaction mixture was poured into 200 ml. of water, and extracted with three 50 ml. portions of ether. The combined extracts were washed with dil. sodium bicarbonate solution, dried with anhydrous sodium sulfate, the ether being evaporated. The residue was distilled under reduced pressure to give 4.5 g. (62%) of 4-bromo-5-methyl-3-phenylisothiazole boiling at 130–132° C./1.0 mm., which solidified at room temperature. Recrystallization from petroleum ether gave the pure product melting at 44–45° C.

4-cyano-5-methyl-3-phenylisothiazole (C) A mixture of 101.6 g. (0.4 mole) of 4-bromo-5-methyl-3-phenylisothiazole, 43 g. (0.48 mole) of cuprous cyanide and 300 ml. γ-picoline was refluxed overnight. The reaction mixture was poured into 2 liters of ice water, acidified with 300 ml. of concentrated hydrochloric acid and filtered with a "Dicalite" (diatomaceous earth) precoated filter. The filtrate was extracted with three 700 ml. portions of ether. The ethereal extracts were washed with water, dried over anhydrous sodium sulfate and evaporated to give an oil. The crude oil was crystallized from ligroin to give 48.5 g. (61%) of 4-cyano-5-methyl-3-phenylisothiazole, M.P. 76–78° C.

Example 6.—5-methyl-3-phenyl-4-isothiazolecarboxylic acid (A)

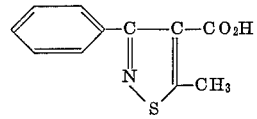

A mixture of 4-cyano-5-methyl-3-phenylisothiazole (1.45 g.), ethylene glycol (8.9 ml.), water (1.8 ml.) and potassium hydroxide (0.885 g.) was heated under reflux for 48 hours.

The mixture was poured onto ice (30 g.). Acidification with hydrochloric acid (6 N) gave a crystalline solid which was washed with water and dried; yield, 1.45 g. (91%), M.P. 148–151° C. Recrystallization (benzene/ligroin) gave 1.19 g., M.P. 151–153° C., of the 4-isothiazolecarboxylic acid.

(B) 5-methyl-3-phenylisothiazole-4-carbonyl chloride

A mixture of 3.2 g. (0.0147 mole) 5-methyl-3-phenylisothiazole-4-carboxylic acid and 5 ml. thionyl chloride was warmed on a water bath at 70–80° C. for one hour. The excess thionyl chloride was removed by distillation under reduced pressure to give an oil which was distilled in vacuo. Yield 3.2 g. (95%) of 5-methyl-3-phenylisothiazole-4-carbonyl chloride, B.P. 122–125° C./0.6 mm.

$\nu_{max.}^{liquid}$ 1770, 1490, 1450, 1400, 1360, 1230, 1105 cm.$^{-1}$ (C) Sodium 6-(5-methyl-3-phenylisothiazole-4-carboxamido)-pencillanate A solution of 3.2 g. (0.0136 mole) 5-methyl-3-phenylisothiazole-4-carbonyl chloride in 5 ml. methylene chloride was added over a period of two minutes to a rapidly stirred solution of 3 g. (0.0138 mole) 6-aminopenicillanic acid and 3.0 g. (0.03 mole) triethylamine in 50 ml. methylene chloride at 5–10° C. The reaction mixture was stirred for one hour at 15° C. and extracted with three 50 ml. portions of water. The combined water extracts were washed with two 50 ml. portions of ether, layered with 100 ml. ethyl acetate and adjusted to pH 2 with 10% hydrochloric acid. The ethyl acetate layer was separated and the water layer was again extracted with two 100 ml. portions of ethyl acetate.

The combined ethyl acetate extracts were washed with 50 ml. water, dried with sodium sulfate, filtered (an additional 50 ml. ethyl acetate was used for washing the flask and filter) and treated with 4 ml. of SEH (39% sodium 2-ethylhexanoate in methyl isobutyl ketone). The clear solution was evaporated to a volume of about 200 ml. and the separated fine needles of sodium 6-(5-methyl-3-phenylisothiazole-4-carboxamido)-penicillanate (Crop A) were collected by filtration. A second crop (Crop B) was obtained from the filtrate by an additional of dry ether. Yield: A, 1.97 g. (33%); B, 0.38 g. (6%), M.P.: A, 184–190° C. (dec.); B, 180–190° C. (dec.).

$\lambda_{max}^{H_2O}$ 266.5 m$\mu$ ($\epsilon$11,200), $\nu_{max}^{H_2O}$ 1780, 1665, 1615, 1540, 1410, 1330 cm.$^{-1}$.

*Analysis.*—Calc'd. for $C_{19}H_{18}N_3O_4S_2Na \cdot H_2O$: C, 49.88; H, 4.11; N, 9.19. Found: C, 50.31, 49.69; H, 4.91, 4.61; N, 9.02, 9.23.

This compound in vitro exhibited Minimum Inhibitory Concentrations of 0.4–0.8 mcg./ml. vs. *Staphylococcus aureus* Smith and of 0.8 mcg./ml. vs. benzylpenicillin-resistant *Staphylococcus aureus* BX–1633–2 and in mice versus *S. aureus* BX–1633–2 exhibited a $CD_{50}$ of about 1.56 mgm./kg. upon intramuscular injection. This compound was also very stable in aqueous acid, having a half-life of 4 hours at pH 2.0.

Example 7.—Sodium 6-[3-(2,6-dichlorophenyl)-5-methyl-4-isothiazolecarboxamido]-penicillanate hydrate Substitution in the procedure of Example 6 for the 4-cyano-5-methyl-3-phenylisothiazole used therein of 4-cyano-3-(2,6-dichlorophenyl) - 5 - methylisothiazole produced sodium 6-[-(2,6-dichlorophenyl - 5-methyl-4-isothiazolecarboxamido]-penicillanate hydrate, M.P. with decomposition above 182° C.

Example 8.—1-amino-2-cyano-1-phenyl-1-propene

Substitution in the procedures of Example 1 for the n-butyronitrile used therin of n-propionitrile produced 1-amino-2-cyano-1-phenyl-1-propene, M.P. 102–103° C.

Example 9.—4-cyano-3-phenylisothiazole and 5-chloro-4-cyano-3-phenylisothiazole (A) To a solution of 3.0 g. (0.019 mole) of 1-amino-2-cyano-1-phenyl-1-propene in 40 ml. of dry toluene was added 9.0 g. (0.076 mole) of thionyl chloride in one portion and the mixture was refluxed for 5 hours and poured on 50 g. of crushed ice. The aqueous layer was separated and extracted with two 20 ml. portions of ether. The toluene layer combined with the ethereal extracts was washed with two 10 ml. portions of 5% sodium bicarbonate solution, dried with anhydrous sodium sulfate and evaporated under reduced pressure. The residual oil was dissolved in 5 ml. of ligroin, chromatographed on an alumina column and eluted with ligroin. The eluate was collected in 50 ml. portions and components of each fraction were detected by gas chromatography. The second and third fractions of the eluate were combined and evaporated into dryness to give a crystalline residue. Recrystallization from petroleum ether gave 150 mg. (3.5%) of colorless needles of 5-chloro-4-cyano-3-phenylisothiazole, M.P. 75–76° C.

Evaporation of fractions No. 4–No. 10 followed by recrystallization from ligroin gave 1.08 g. (31%) of 4-cyano-3-phenylisothiazole, M.P. 54–55° C.

(B) A solution of 3.2 g. (0.02 mole) of 1-amino-2-cyano-1-phenyl-1-propene and 8.0 g. (0.06 mole) of sulfur monochloride in 30 ml. of toluene was refluxed for 5 hours and the reaction mixture was purified by the procedure as described above to yield a trace of 5-chloro-4-cyano-3-phenylisothiazole and 1.55 g. (42%) of 4-cyano-3-phenylisothiazole.

Example 10.—1-amino-2-cyano-1-(2,6-dichlorophenyl)-1-propene

Substitution in the procedures of Example 1 for the benzonitrile and the n-butyronitrile used therein of 2,6-dichlorobenzonitrile and n-propionitrile, respectively, produced 1-amino-2-cyano-1(2,6-dichlorophenyl)-1-propene, M.P. 95–98° C.

Example 11.—4-cyano-3-(2,6-dichlorophenyl)isothiazole (A) A solution of 1.0 g. (0.0044 mole) of 1-amino-2-cyano-1-(2,6-dichlorophenyl)-1-propene and 2.6 g. (0.022 mole) of thionyl chloride in 40 ml. of dry toluene was refluxed for 10 hours to yield 0.45 g. (40%), following purification, of 4-cyano-3-(2,6-dichlorophenyl)isothiazole melting at 151–152° C.

(B) A mixture of 4.8 g. (0.021 mole) of 1-amino-2-cyano-1(2,6-dichlorophenyl)-1-propene and 15 g. (0.11 mole) of sulfur monochloride in 80 ml. of dry toluene was refluxed for 48 hours to yield 2.5 g. (47%), following purification, of 4-cyano-3-(2,6-dichlorophenyl)isothiazole.

Example 12.—Sodium 6-(3-phenylisothiazole-4-carboxamido)penicillanate

Substitution in the procedure of Example 6 for the 4-cyano-5-methyl-3-phenylisothiazole used therein of 4-cyano-3-phenylisothiazole produced sodium 6-(3-phenylisothiazole-4-carboxamido)phenicillanate, M.P. with decomposition 235–238° C.

Example 13.—Sodium 6[3-(2,6-dichlorophenyl) isothiazole-4-carboxamido]-penicillanate Substitution in the procedure of Example 6 for the 4-cyano-5-methyl-3-phenylisothiazole used therein of 4-cyano-3-(2,6-dichlorophenyl)isothiazole produced sodium 6 - [3 - (2,6-dichlorophenyl)isothiazole-4-carboxamido] penicillanate, M.P. with decomposition 200–210° C.

Example 14.—4-cyano-5-methyl-3-n-propylisothiazole

Substitution in the procedures of Example 2 for the 1-amino-2-cyano-1-phenyl-1-butene used therein of 4-amino-3-cyano-3-heptene produced 4-cyano-5-methyl-3-n-propylisothiazole, B.P. 73–76° C./4.5–5.5 mm., which was converted to 5-methyl-3-n-propylisothiazole-4-carboxylic acid, M.P. 83–84.5° C.

Example 15.—3,5-diphenylisothiazole

Substitution in the procedure of Example 5(A) for the 1-amino-1-phenyl-1-butene used therein of 4.18 g. (0.02 mole) of 1-amino-1,3-diphenyl-1-propene produced 360 mg. of 3,5-diphenylisothiazole, M.P. 75–77° C.

Example 16.—4-carboethoxy-5-methyl-3-phenylisothiazole

One mole of 1-amino-2-carboethoxy-1-phenyl-1-butene is dissolved in 1500 ml. of toluene. Three moles of thionyl chloride is added in one portion and the solution refluxed for 12 hours. The cooled solution is poured into crushed ice and extracted several times with 300 ml. portions of ether. The combined ethereal extracts are washed with water and dried over sodium sulfate to produce a crude oil comprising the desired 2-carboethoxy-5-methyl-3-phenylisothiazole. The crude oil is purified by chromatography to produce product acceptable for saponification to the 4-isothiazolecarboxylic acid, M.P. 151–153° C.

Example 17.—4-carbomethoxy-3-(2-chlorophenyl)-5-methylisothiazole

Substitution in the procedure of Example 4 for the 1 - amino-2-cyano-1-(2,6-dichlorophenyl)-1-butene used therein of 1-amino-2-carbomethoxy-3-(2-chlorophenyl)-1-butene produces 4-carbomethoxy-3-(2-chlorophenyl)-5-methylisothiazole.

Example 18.—4-carbamoyl-5-methyl-3-phenylisothiazole

Substitution in the procedure of Example 2 for the 1-amino-2-cyano-1-phenyl-1-butene used therein of 2-carbamoyl-5-methyl-1-phenyl-1-butene produces 4-carbamoyl-5-methyl-3-phenylisothiazole. The product is readily hydrolyzed to the corresponding 4-isothiazolecarboxylic acid.

Example 19.—3-(2-chloro-6-fluorophenyl)-4-cyano-5-methylisothiazole

Substitution in the procedure of Example 2 for the 1-amino-2-cyano-1-phenyl-1-butene used therein of 1-amino-2-cyano-1-(2-chloro-6-fluorophenyl)-1-butene produces 3-(2-chloro-6-fluorophenyl)-4-cyano-5-methylisothiazole.

Example 20.—4-cyano-3,5-dimethylisothiazole

Substitution in the procedure of Example 2 for the 1-amino-2-cyano-1-phenyl-1-butene used therein of 2-amino-3-cyano-2-pentene produces 4-cyano-3,5-dimethylisothiazole.

Example 21.—4-cyano-3-(2,6-dichloro-4-methylphenyl)-5-methylisothiazole

Substitution in the procedure of Example 2 for the 1-amino-2-cyano-1-phenyl-1-butene used therein of 1-amino - 2-cyano-1-(2,6-dichloro-4-methylphenyl)-1-butene produces 4 - cyano - 3-(2,6-dichloro-4-methylphenyl)-5-methylisothiazole.

Example 22.—4-cyano-5-methyl-3-(2,4,6-trichlorophenyl)-isothiazole

Substitution in the procedure of Example 2 for the 1-amino-2-cyano-1-phenyl-1-butene used therein of 1-amino-2-cyano-1(2,4,6-trichlorophenyl)-1-butene produces 4-cyano-5-methyl-3-(2,4,6-trichlorophenyl)isothiazole.

Example 23.—4-cyano-3-(2-chloro-6-fluoro-4-methoxyphenyl)-5-methylisothiazole

Substitution in the procedure of Example 2 for the 1-amino-2-cyano-1-phenyl-1-butene used therein of 1-amino - 1-(2-chloro-6-fluoro-4-methoxyphenyl)-2-cyano-1 - butene produces 4 - cyano - 3 - (2-chloro-6-fluoro-4-methoxyphenyl)-5-methylisothiazole.

Example 24.—4-cyano-5-methyl-3-(4-trifluoromethylphenyl)-isothiazole

Substitution in the procedure of Example 2 for the 1-amino-2-cyano-1-phenyl-1-butene used therein of 1-amino - 2-cyano-1-(4-trifluoromethylphenyl-1-butene produces 4 - cyano-5-methyl-3-(4-trifluoromethylphenyl)-isothiazole.

Example 25.—4-cyano-3-[2,6-di(trifluoromethyl)phenyl]-5-methylisothiazole

Substitution in the procedure of Example 2 for the 1-amino-2-cyano-1-phenyl-1-butene used therein of 1-amino-2 - cyano-1-[2,6-di(trifluoromethyl)phenyl]-1-butene produces 4 - cyano - 3 - [2,6-di(trifluoromethyl)phenyl]-5-methylisothiazole.

Example 26.—4-cyano-3-(4-methoxyphenyl)-5-methylisothiazole

Substitution in the procedure of Example 2 for the 1-amino-2-cyano-1-phenyl-1-butene used therein of 1-amino-2-cyano-1-(4-methoxyphenyl)-1-butene produces 4-cyano-3-(4-methoxyphenyl)-5-methylisothiazole.

Example 27.—4-cyano-5-methyl-3-(3-nitrophenyl)-isothiazole

Substitution in the procedure of Example 2 for the 1-amino-2-cyano-1-phenyl-1-butene used therein of 1-amino - 2-cyano-1-(3-nitrophenyl)-1-butene produces 4-cyano-5-methyl-3-(3-nitrophenyl)-isothiazole.

Example 28.—4-cyano-5-ethyl-3-phenylisothiazole

Substitution in the procedure of Example 2 for the 1-amino-2-cyano-1-phenyl-1-butene used therein of 1-amino-2-cyano-1-phenyl-1-pentene produces 4-cyano-5-ethyl-3-phenylisothiazole.

Example 29.—5-butyl-4-cyano-3-phenylisothiazole

Substitution in the procedure of Example 2 for the 1-amino-2-cyano-1-phenyl-1-butene used therein of 1-amino-2-cyano-1-phenyl-1-heptene produces 5-butyl-4-cyano-3-phenylisothiazole.

Example 30.—4-cyano-3,5-diphenylisothiazole

Substitution in the procedure of Example 2 for the 1-amino-2-cyano-1-phenyl-1-butene used therein of 1-amino-2-cyano-1,3-diphenyl-1-propene produces 4-cyano-3,5-diphenylisothiazole.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit of the invention.

We claim:

1. The process for the synthesis of isothiazoles having the formula

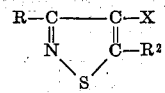

wherein
R is (lower)alkyl or Ar, and $R^2$ is hydrogen, halogen, (lower)alkyl or Ar, wherein Ar is a group of the formula

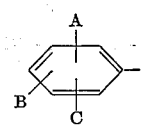

in which A, B and C are alike or different and each represent hydrogen, fluoro, chloro, bromo, iodo, trifluoromethyl, methylsulfonyl, nitro, (lower)alkyl or (lower)alkoxy;

X represents

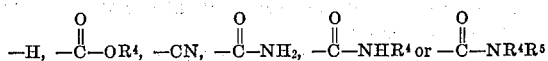

in which $R^4$ and $R^5$ are alike or different and each is (lower)alkyl or Ar, Ar being as defined above, which comprises the *mixing* together an amino compound having the formula

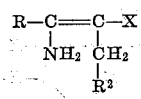

in which R and $R^2$ are as defined above and X represents

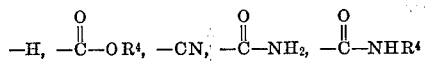

or

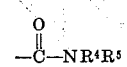

in which $R^4$ and $R^5$ are alike or different and each is (lower)alkyl or Ar, Ar being as defined above with a large excess of a thionyl halide or sulfur chloride which serves as the reaction solvent or in a ratio of at least one mole of sulfur chloride or a thionyl halide to one mole of the amino compound in a reaction inert solvent in the temperature range of about 0° C. to the reflux temperature of the reaction system for a period of time of about one to forty-eight hours.

2. The process of claim 1 for the synthesis of isothiazoles having the formula

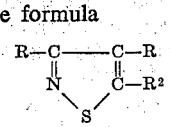

wherein
R is (lower)alkyl or Ar, and $R^2$ is hydrogen, halogen (lower)alkyl or Ar, wherein Ar is a group of the formula

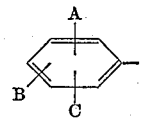

in which A, B and C are alike or different and each represent hydrogen, fluoro, chloro, bromo, iodo, trifluoromethyl, methylsulfonyl, nitro, (lower)alkyl or (lower)alkoxy;
X represents

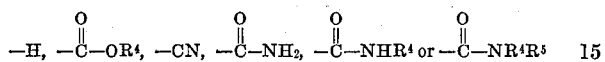

in which $R^4$ and $R^5$ are alike or different and each is (lower)alkyl or Ar, Ar being as defined above, which comprises the *mixing* together an amino compound having the formula

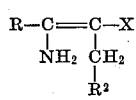

in which R and $R^2$ are as defined above and X represents

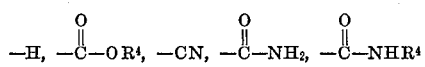

or

in which $R^4$ and $R^5$ are alike or different and each is (lower)alkyl or Ar, Ar being as defined above,
with thionyl chloride or sulfur chloride
in a ratio of about three to six moles of thionyl chloride or sulfur chloride to about one mole of the amino compound
in a reaction-inert solvent in the temperature range of about 0° C.
to about the reflux temperature of the solvent system for a period of time of about two to forty-eight hours.

3. The process of claim 1 for the synthesis of isothiazoles having the formula

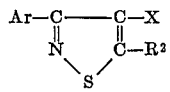

wherein $R^2$ is (lower)alkyl and AR is a group of the formula

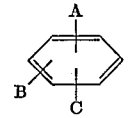

in which A, B and C are alike or different and each represent hydrogen, fluoro, chloro, bromo, iodo, trifluoromethyl, methylsulfonyl, nitro, (lower)alkyl or (lower)alkoxy;
X represents

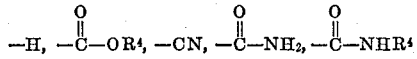

or

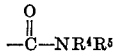

in which $R^4$ and $R^5$ are alike or different and each is (lower)alkyl or Ar, Ar being as defined above, which comprises the *mixing* together an amino compound having the formula

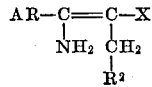

in which Ar and $R^2$ are as defined above and X represents

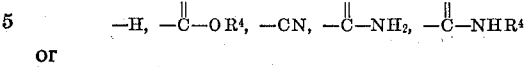

or

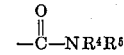

in which $R^4$ and $R^5$ are alike or different and each is (lower)alkyl or Ar, Ar being as defined above,
with thionyl chloride or sulfur chloride
in a ratio of about three to six moles of thionyl chloride or sulfur chloride to about one mole of the amino compound
in a reaction-inert solvent
in the temperature range of about 0° C. to about the reflux temperature of the solvent system for a period of time of about two to forty-eight hours.

4. The process of claim 1 for the synthesis of isothiazoles having the formula

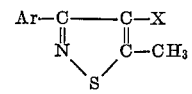

wherein Ar is a group of the formula

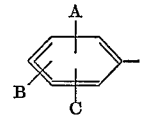

in which A, B and C are alike or different and each represent hydrogen, fluoro, chloro, bromo, iodo, trifluoromethyl, methylsulfonyl, nitro, (lower)alkyl or (lower)alkoxy;
X represents

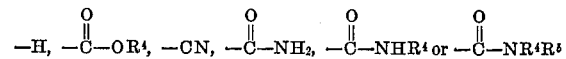

in which $R^4$ and $R^5$ are alike or different and are (lower)alkyl or Ar, Ar being as defined above,
which comprises the *mixing* together an amino compound having the formula

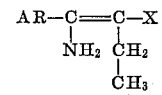

in which Ar is defined above and X represents

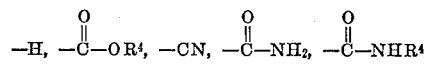

or

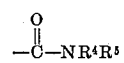

in which $R^4$ and $R^5$ are alike or different and are (lower)alkyl or Ar, Ar being as defined above,
with thionyl chloride or sulfur chloride
in a ratio of about three to six moles of thionyl chloride or sulfur chloride to about one mole of the amino compound
in a reaction-inert solvent in the temperature range of about 0° C. to about the reflux temperature of the solvent system, for a period of time of about two to forty-eight hours.

5. The process of claim 2 for the synthesis of isothiazoles having the formula

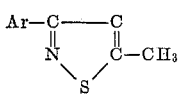

wherein
Ar is a group of the formula

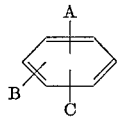

in which each of A, B and C represent hydrogen, fluoro, chloro, bromo, iodo;
X represents

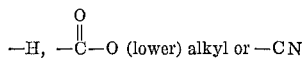

which comprises the *mixing* together an amino compound having the formula

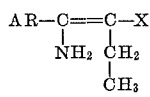

in which Ar is as defined above and X represents

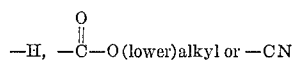

with thionyl chloride or sulfur chloride
in a ratio of about three to six moles of thionyl chloride or sulful chloride to about one mole of the amino compound
in a reaction-inert solvent
in the temperature range of about 0° C. to about the reflux temperature of the solvent system
for a period of time of about two to forty-eight hours.

References Cited
UNITED STATES PATENTS

| | | | |
|---|---|---|---|
| 3,311,611 | 3/1967 | Lemieux et al. | 260—302 |
| 3,341,518 | 9/1967 | Natio et al. | 260—302 |

ALEX MAZEL, Primary Examiner

R. J. GALLAGHER, Assistant Examiner

U.S. Cl. X.R.

260—239.1, 465, 465.4, 465.8, 471, 481, 566, 570.5; 424—271

UNITED STATES PATENT OFFICE
CERTIFICATE OF CORRECTION

Patent No. 3,479,365     Dated December 31, 1969

Inventor(s) Takayuki Naito and Susumu Nakagawa

It is certified that error appears in the above-identified patent and that said Letters Patent are hereby corrected as shown below:

In the claims, the first formula of claim 2 should read as follows:

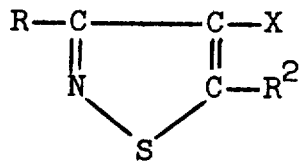

(column 14, lines 70-73)

the second formula of claim 3 should read as follows:

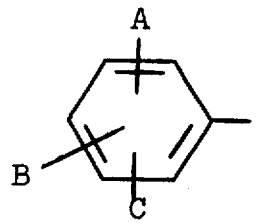

(column 15, lines 51-55)

the first formula of claim 5 should read as follows:

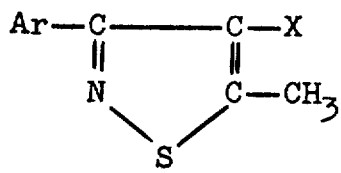

(column 17, lines 3-6)

UNITED STATES PATENT OFFICE
CERTIFICATE OF CORRECTION

Patent No. 3,479,365      Dated December 31, 1969

Inventor(s) Takayuki Naito and Susumu Nakagawa

It is certified that error appears in the above-identified patent and that said Letters Patent are hereby corrected as shown below:

- 2 - the second formula of claim 5 should read as follows:

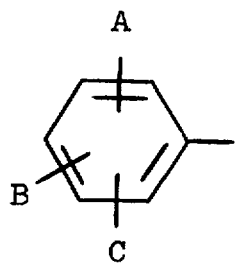

(column 17, lines 9-13)

SIGNED AND SEALED

JUN 2 1970

(SEAL)
Attest:

Edward M. Fletcher, Jr.
Attesting Officer

WILLIAM E. SCHUYLER, JR.
Commissioner of Patents